US012587786B2

(12) United States Patent
Agrawal et al.

(10) Patent No.: US 12,587,786 B2
(45) Date of Patent: Mar. 24, 2026

(54) ACTIVE NOISE CANCELLATION ADJUSTMENT

(71) Applicant: Motorola Mobility LLC, Chicago, IL (US)

(72) Inventors: Amit Kumar Agrawal, Bangalore (IN); Himanshu Chug, Bangalore (IN); Shivam Raj, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 179 days.

(21) Appl. No.: 18/420,954

(22) Filed: Jan. 24, 2024

(65) Prior Publication Data

US 2025/0240564 A1 Jul. 24, 2025

(51) Int. Cl.
*H04R 3/04* (2006.01)
*H04R 5/033* (2006.01)
*H04R 5/04* (2006.01)

(52) U.S. Cl.
CPC ............... *H04R 3/04* (2013.01); *H04R 5/033* (2013.01); *H04R 5/04* (2013.01); *H04R 2460/01* (2013.01)

(58) Field of Classification Search
CPC .... H04R 1/1083; H04R 1/1041; H04R 5/033; H04R 5/04; H04R 2460/01; H04R 3/04; G10K 11/1783; G10K 11/17837; G10K 11/17885
See application file for complete search history.

(56) References Cited

U.S. PATENT DOCUMENTS

2016/0125869 A1* 5/2016 Kulavik .................... H04S 7/00 381/71.1
2017/0194020 A1* 7/2017 Miller ................. G10L 21/0272
2019/0035381 A1* 1/2019 Maziewski ...... G10K 11/17827
2020/0135163 A1* 4/2020 Lovitt .............. G10K 11/17827
2023/0386443 A1* 11/2023 Bean ................ G10K 11/17873

OTHER PUBLICATIONS

Beijing Xiaomi Mobile Software C , “Xiaomi Earbuds”, Beijing Xiaomi Mobile Software Co., Ltd [retrieved Oct. 16, 2023]. Retrieved from the Internet <https://play.google.com/store/apps/details?id=com.mi.earphone&hl=en_US&gl=US>, 3 pages.

(Continued)

*Primary Examiner* — Jason R Kurr
(74) *Attorney, Agent, or Firm* — FIG. 1 Patents

(57) ABSTRACT

In aspects of active noise cancellation (ANC) adjustment, a mobile device is in communication with a headset that has ANC. The mobile device and/or the headset implements a noise cancellation manager to detect that the headset is in communication with the mobile device, and monitor for contextual conditions associated with the ANC of the headset. The noise cancellation manager is implemented to detect one or more contextual triggers from the contextual conditions, where the contextual triggers indicate an ANC adjustment scenario. Based on detecting the one or more contextual triggers and/or the ANC adjustment scenario, the noise cancellation manager adjusts the ANC of the headset from a first level of the ANC to a second level of the ANC, where the first level of the ANC provides a different amount of the ANC relative to the second level of the ANC.

14 Claims, 7 Drawing Sheets

(56) References Cited

OTHER PUBLICATIONS

HEYTAP, “HeyMelody”, HeyTap available on Google Play [retrieved Oct. 16, 2023]. Retrieved from the Internet <https://play.google.com/store/apps/details?id=com.heytap.headset&hl=en_US&gl=US>, 3 pages.

Samsung Electronics Co., Ltd., “Galaxy Wearable (Samsung Gear)”, Samsung Electronics Co., Ltd. available on Google Play [retrieved Oct. 16, 2023]. Retrieved from the Internet <https://play.google.com/store/apps/details?id=com.samsung.android.app.watchmanager&hl=en_US&gl=US>, 4 pages.

* cited by examiner

ACTIVE NOISE CANCELLATION ADJUSTMENT

BACKGROUND

Use of headsets in conjunction with mobile devices has become quite common. These headsets allow individuals to hear various different audible media (e.g., music, podcasts, sound accompanying video, and the like) without that media annoying others and/or while maintaining the confidentiality of the media. The development of active noise cancellation (ANC) for such headsets has been a particularly welcome development since ANC limits the amount of ambient noise heard by users of the headsets, which, in turn, allows users to better hear audible media or other sounds from the headsets. While ANC is generally a desirable feature of a headset, ANC can be desirable in some real-life scenarios while also being undesirable in other real-life scenarios. As such, most headsets that have ANC as a feature also have a mechanism for turning the ANC on or off, and that mechanism may be operated at the headset itself and/or by a mobile device that communicates with the headset. This mechanism generally allows an individual to use the ANC when desired and turn off the ANC when it is not desired. However, this mechanism does not address scenarios where use of ANC may be desirable or undesirable, but use of the mechanism to adjust, turn on, or turn off the ANC may not be convenient.

BRIEF DESCRIPTION OF THE DRAWINGS

Implementations of the techniques for active noise cancellation (ANC) adjustment are described with reference to the following Figures. The same numbers may be used throughout to reference like features and components shown in the Figures.

DETAILED DESCRIPTION

Figure 1:
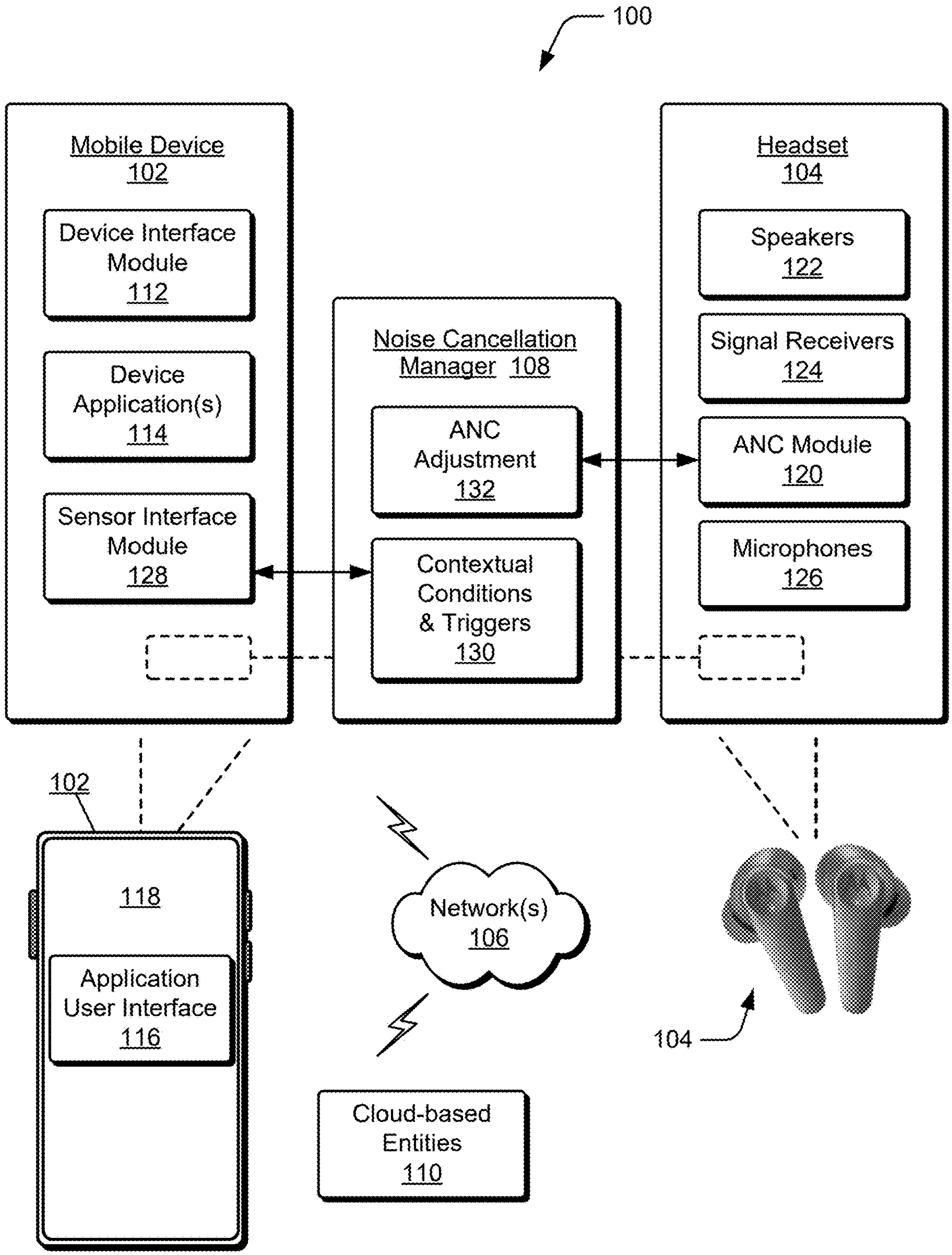
FIG. 1 illustrates an example system for ANC adjustment in accordance with one or more implementations as described herein.

Implementations of the techniques for active noise cancellation (ANC) adjustment protection may be implemented as described herein. A mobile device, such as any type of a wireless device, media device, mobile phone, flip phone, client device, tablet, computing, communication, entertainment, gaming, media playback, and/or any other type of computing, consumer, and/or electronic device, or a system of any combination of such devices, may be configured to perform techniques of ANC adjustment as described herein. Alternatively or in addition, a headset, such as any type of over-the-ear headphones, earbuds, an earpiece, and/or any other type of headset having ANC may be configured to perform the techniques of ANC adjustment, as described herein. In one or more implementations, a mobile device and/or a headset include a noise cancellation manager, which can be used to implement aspects of the techniques for ANC adjustment.

Headsets with ANC have become extraordinarily popular in recent years, and the ANC feature provides an individual with the ability to limit background noise while using a headset. Further, if the individual is listening to sound coming from the headset, that sound is typically heard with greater clarity. This ability is desirable in an array of settings. As one example, an individual riding public transportation may want to limit the amount of ambient noise that the individual hears while listening to content (e.g., a podcast) while riding to a destination. An individual working at a busy office may want to limit the amount of ambient noise that the individual hears while listening to music and performing tasks on a computer. Wearing a headset with ANC and using the ANC to cancel background noise can accommodate both of these scenarios and, if desired, the users of the headsets can listen to content, which the user has a desire to hear.

While ANC is ideal for a great many scenarios, there are also a great many scenarios in which it is desirable to increase ANC (e.g., by amplifying ANC or turning ANC on) or decrease ANC (e.g., by lessening ANC or turning ANC off). In many of these scenarios, it will be quite simple for an individual to manually adjust the amount of ANC being produced by a headset. However, there are also a great number of scenarios in which an individual is unable to manually adjust the amount of ANC or is unaware that the amount of ANC could or should be adjusted.

As described herein, the term "increase" and its conjugations used to refer to ANC includes turning ANC on (i.e., going from no ANC to some amount of ANC) as well as increasing from a first level of ANC to a higher, second level of ANC. Further, the term "decrease" and its conjugations as used herein to refer to ANC includes turning ANC off (i.e., going from some amount of ANC to no ANC) as well as decreasing from a first level of ANC to a lower, second level of ANC.

As an example scenario in which an individual would like to increase ANC but is unable to do so, the individual may be in a quiet environment, such as an office or a bedroom. The individual is listening to sound on a headset from any of a variety of sources, such as music, a video, a meeting, or the like and, and since the environment is quiet, the individual is not using the ANC feature of the headset. The individual then moves out of the quiet environment and into a relatively noisy environment. During the move, the individual may be carrying several items and is unable to increase (e.g., turn on in this example) the ANC of the headset. An automatic increase in the ANC feature of the headset is desirable in this example scenario.

In another example scenario in which a first individual would like to decrease ANC, but is unaware that it would be desirable to do so, the individual may be in an environment, such as in a residence, listening to audio on a headset from any of a variety of sources such as music, a video, a meeting, or the like but, since a television is being watched by a second individual, the first individual is using the ANC feature of the headset. The second individual then turns off the television and, unbeknownst to the first individual, leaves the residence to go somewhere. In such a scenario, the first individual may want to decrease (e.g., turn off in this example) the ANC of the headset to hear surrounding sounds, such as a doorbell or phone ring since the second individual is no longer present to hear such sounds. However, the first individual is unaware that the second individual has left and does not know to manually decrease or turn off the ANC. An automatic decrease in the ANC feature of the headset is desirable in this example scenario.

Accordingly, there is provided herein implementations of ANC adjustment that can automatically adjust the ANC of a headset in scenarios where adjustment of the ANC is desired but manual adjustment of the ANC is not ideal. In particular, a mobile device is provided in communication with a headset having the ANC feature and, in response to contextual triggers, the mobile device, the headset, or both initiate and/or perform adjustment of the ANC. Advantageously, this automatic adjustment of ANC can provide an increase or decrease of the ANC of the headset in multiple scenarios where either manual adjustment of the ANC is difficult, or the user of the headset is unaware that adjustment of the ANC is desirable.

In aspects of the described techniques, a mobile device and/or a headset includes a noise cancellation manager that implements monitoring of contextual conditions associated with the mobile device, the headset, or both for detection of one or more contextual triggers that indicate an ANC adjustment scenario. Then, based on the one or more contextual triggers indicating an ANC adjustment scenario, the noise cancellation manager adjusts an ANC of the headset from a first level of the ANC to a second level of the ANC, where the first level of the ANC provides a different amount of the ANC relative to the second level of the ANC.

In some implementations, the ANC adjustment is at least partially integrated in a mobile device that communicates with a headset. The mobile device includes the noise cancellation manager implemented to cause the mobile device, the headset, or both to detect one or more contextual triggers indicating an ANC adjustment scenario. Based on detecting the one or more contextual triggers, the noise cancellation manager can initiate and/or perform an adjustment of the ANC feature of the headset. The noise cancellation manager typically adjusts the ANC of the headset from a first level of the ANC to a second level of the ANC, where the first level of the ANC provides a different amount of the ANC relative to the second level of the ANC.

In some implementations, the ANC adjustment is provided as a method performed by the noise cancellation manager. The method includes monitoring contextual conditions associated with a mobile device and/or a headset and detecting, based on the monitoring of the contextual conditions, one or more contextual triggers indicating an ANC adjustment scenario. Based on an occurrence of the one or more contextual triggers, the Noise cancellation manager initiates and/or performs an adjustment of the ANC feature of the headset. Again, the noise cancellation manager typically adjusts the ANC of the headset from a first level of the ANC to a second level of ANC, the first level of the ANC providing a different amount of the ANC relative to the second level of the ANC.

In general, adjustment of the ANC in the methods, devices, and/or systems described herein can be initiated and carried out automatically and without user intervention. It is also contemplated, however, that adjustment of the ANC in the methods, devices, and/or systems discussed herein can be partially automatic. For example, in some scenarios, the noise cancellation manager causes the mobile device, the headset, or both to signal that an ANC adjustment is contemplated and request a confirmation from the user that the ANC adjustment is desired.

While features and concepts of the described techniques for ANC adjustment can be implemented in any number of different devices, systems, environments, and/or configurations, implementations of the techniques for ANC adjustment are described in the context of the following example devices, systems, and methods.

FIG. 1 illustrates an example system 100 for ANC adjustment, as described herein. The system 100 includes a mobile device 102, a headset 104, a communication network 106, and a noise cancellation manager 108. Examples of the mobile device 102 include any type of a wireless device, mobile device, mobile phone, flip phone, client device, companion device, tablet, computing device, communication device, entertainment device, gaming device, media playback device, any other type of computing, consumer, and/or electronic device. Examples of the headset 104 can include over-the-ear headphones, earbuds, an earpiece, and/or any other type of headset having or implemented with the ANC feature.

The mobile device 102 can be implemented with various components, such as a processor system and memory, as well as any number and combination of different components as further described with reference to the example device shown in FIG. 7. In implementations, the mobile device 102 includes various radios for wireless communication with other devices. For example, the mobile device 102 can include at least one of a Bluetooth (BT) and/or Bluetooth Low Energy (BLE) transceiver, as well as a near field communication (NFC) transceiver, or the like. In some cases, the mobile device 102 includes at least one of a WiFi radio, a cellular radio, a global positioning satellite (GPS) radio, or any available type of device communication interface.

In some implementations, the devices, applications, modules, servers, and/or services described herein communicate via the communication network 106, such as for data communication between the mobile device 102 and various cloud-based entities 110, such as devices, services, servers, and/or systems in the network cloud. The communication network 106 can include a wired and/or a wireless network. The communication network 106 is implemented using any type of network topology and/or communication protocol and is represented or otherwise implemented as a combination of two or more networks, to include IP-based networks, cellular networks, and/or the Internet. The communication network 106 can include mobile operator networks that are managed by a mobile network operator and/or other network operators, such as a communication service provider, mobile phone provider, and/or Internet service provider.

The mobile device 102 includes various functionalities that enable the device to implement different aspects of ANC adjustment, as described herein. For example, the mobile device 102 can include a connectivity module and/or a device interface module 112, as generally described with reference to the example device shown in FIG. 7. The connectivity module represents functionality (e.g., logic, software, and/or hardware) enabling the mobile device 102 to interconnect with the cloud-based entities 110 and/or other devices, systems, and networks. For example, the connectivity module enables wireless and/or wired connectivity of the mobile device 102. The device interface module 112 represents functionality enabling the mobile device 102 to interface with other devices and/or applications of the mobile device 102, and the device interface module 112 can include one or more device settings and/or device configurations of the mobile device.

In one or more implementations, the mobile device 102 includes and implements one or more device applications 114, such as any type of financial technology application, payment application, photo application, messaging application, email application, video communication application, cellular communication application, music/audio application, gaming application, media application, social platform application, and/or any other of the many possible types of device applications. Many of the device applications 114 have an associated application user interface 116 that is generated and displayed for user interaction and viewing, such as on a display device 118 of the mobile device 102. Generally, an application user interface, or any other type of video, image, graphic, graphical code and the like is digital image content that is displayable on the display of the mobile device 102.

Similar to the mobile device 102, the headset 104 also includes various functionalities that enable the headset to implement different aspects of ANC adjustment, as described herein. In the illustrated example, the headset 104 includes active noise cancellation (ANC) 120 (e.g., implemented as a feature, module, software, firmware, and/or the like), one or more speakers 122, one or more signal receivers 124, and one or more microphones 126. The ANC 120 can be implemented with any of a variety of ANC technologies. Typically, the ANC 120 causes the headset 104 to emit sound waves that are opposite to the ambient noise, thereby cancelling at least a portion of the ambient noise. For more sophisticated ANC, the one or more microphones 126 receive the ambient noise to aid in producing sound waves that are opposite to the ambient noise. The one or more speakers 122 can be any of a variety of speakers suitable for use in the headset 104, such as dynamic drivers. The signal receiver 124 can be a wireless and/or Bluetooth receiver and/or can be a receiver for a wired connection. As such, the headset 104 can be a wired headset or a wireless headset, and implemented for audio communication with the mobile device 102. In a typical scenario, the headset 104 receives signals from the mobile device 102 and produces sound from the one or more speakers 122. At the same time, when activated, the ANC 120 would cause the one or more speakers 122 to send out sounds waves for cancelling ambient noise.

In the example system 100 for ANC adjustment, the mobile device 102 and/or the headset 104 provides for ANC adjustment functionality. The mobile device 102 and/or the headset 104 can implement the noise cancellation manager 108 for increasing, decreasing, or otherwise controlling the ANC 120 of the headset 104, and for monitoring and detecting contextual conditions and triggers. The noise cancellation manager 108 (e.g., and instantiations thereof implemented in the mobile device 102 and/or the headset 104) represents functionality (e.g., logic, software, and/or hardware) enabling implementation of described techniques for ANC adjustment. In one or more examples, the noise cancellation manager 108 can be implemented as computer instructions stored on computer-readable storage media and executed by a processor system of the mobile device 102 and/or the headset 104. Alternatively or in addition, the noise cancellation manager 108 is implemented at least partially in hardware of a device. In various implementations, the headset 104 may be implemented with various components, such as a processor system and memory, as well as any number and combination of different components as further described with reference to the example device shown in FIG. 7.

In one or more implementations, the noise cancellation manager 108 can include independent processing, memory, and/or logic components functioning as a computing and/or electronic device integrated with the mobile device 102 and/or with the headset 104. Alternatively or in addition, the noise cancellation manager 108 can be implemented in software, in hardware, or as a combination of software and hardware components. In one or more examples, the noise cancellation manager 108 is implemented as a software application or module, such as executable software instructions (e.g., computer-executable instructions) that are executable with a processor system of the mobile device 102 and/or the headset 104 to implement the techniques and features described herein. As a software application or module, the noise cancellation manager 108 is stored on computer-readable storage memory (e.g., memory of a device), or in any other suitable memory device or electronic data storage implemented with the module. Alternatively or in addition, the noise cancellation manager 108 is implemented in firmware and/or at least partially in computer hardware. For example, at least part of the noise cancellation manager 108 is executable by a computer processor, and/or at least part of the noise cancellation manager 108 is implemented in logic circuitry. In at least one implementation the noise cancellation manager 108 can be implemented as part of and/or in conjunction with an operating system of the mobile device 102 and/or the headset 104.

In implementations, the noise cancellation manager 108 can include or utilize a sensor interface module 128 to implement monitoring and/or detecting of contextual conditions and triggers 130. In this example, the noise cancellation manager 108 provides ANC adjustment functionality for the mobile device 102, the headset 104, or both based at least in part on the operations of the sensor interface module 128.

In aspects of the techniques described for ANC adjustment, the ANC feature of the headset 104 can be automatically adjusted based on environment context, contextual conditions, and detected contextual triggers. In implementations, the noise cancellation manager 108 can detect that the headset 104 is in communication with the mobile device 102, and monitor for contextual conditions associated with the ANC feature of the headset. The noise cancellation manager 108 can also detect one or more of the contextual triggers 130 from the contextual conditions, where the contextual triggers indicate an ANC adjustment scenario. For example, a contextual trigger 130 may be detected as a detected change of a quiet location, a noisy location, movement, or a lack of movement. A contextual trigger 130 may also be detected as an elevation in ambient noise, such as detected by a sensor of the mobile device 102 and/or the headset 104. The contextual triggers 130 can also include movement of the mobile device 102 and/or the headset 104 into a location where ambient announcements occur, such as in an airplane or other commercial transportation contexts.

In implementations, the noise cancellation manager 108 can adjust the ANC feature of the headset 104 from a first level of the ANC to a second level of the ANC based on an ANC adjustment 132, where the first level of the ANC provides a different amount of the ANC relative to the second level of the ANC. For example, the second level of the ANC may be less than the first level of the ANC, or the second level of the ANC may be greater than the first level of the ANC, depending on the context of the environment and the ANC adjustment. In an implementation, the noise cancellation manager 108 can also cause the mobile device 102 to display a user interface after an ANC adjustment 132, and the user interface provides a user of the mobile device the option to return to the previous level of the ANC.

In other aspects, the noise cancellation manager 108 can be implemented to utilize a trained machine learning module to analyze one or more of the detected contextual triggers 130, and determine to adjust the ANC of the headset. The trained machine learning module can be trained by recording instance contextual conditions from the monitored contextual conditions, where the instance contextual conditions are the contextual conditions that are present when the ANC is manually adjusted. The machine learning module can thereby be trained to recognize changes of the monitored contextual conditions as the one or more contextual triggers that signal to adjust the ANC of the headset.

In one or more implementations, the noise cancellation manager 108 is implemented using a machine learning (ML) model or algorithm (e.g., a neural network, artificial intelligence (AI) algorithms). The noise cancellation manager 108 implemented as a machine learning model may include AI, a ML model or algorithm, a convolutional neural network (CNN), and/or any other type of machine learning model to implement features of the mobile device access protection. As used herein, the term "machine learning model" refers to a computer representation that is trainable based on inputs to approximate unknown functions. For example, a machine learning model can utilize algorithms to learn from, and make predictions on, inputs of known data (e.g., training and/or reference images) by analyzing the known data to learn to generate outputs. In the example system 100, the noise cancellation manager 108 can detect the one or more contextual triggers 130 by analyzing, using a trained machine learning module, the contextual conditions to determine an adjustment of the ANC features of the headset 104.

Figure 2:
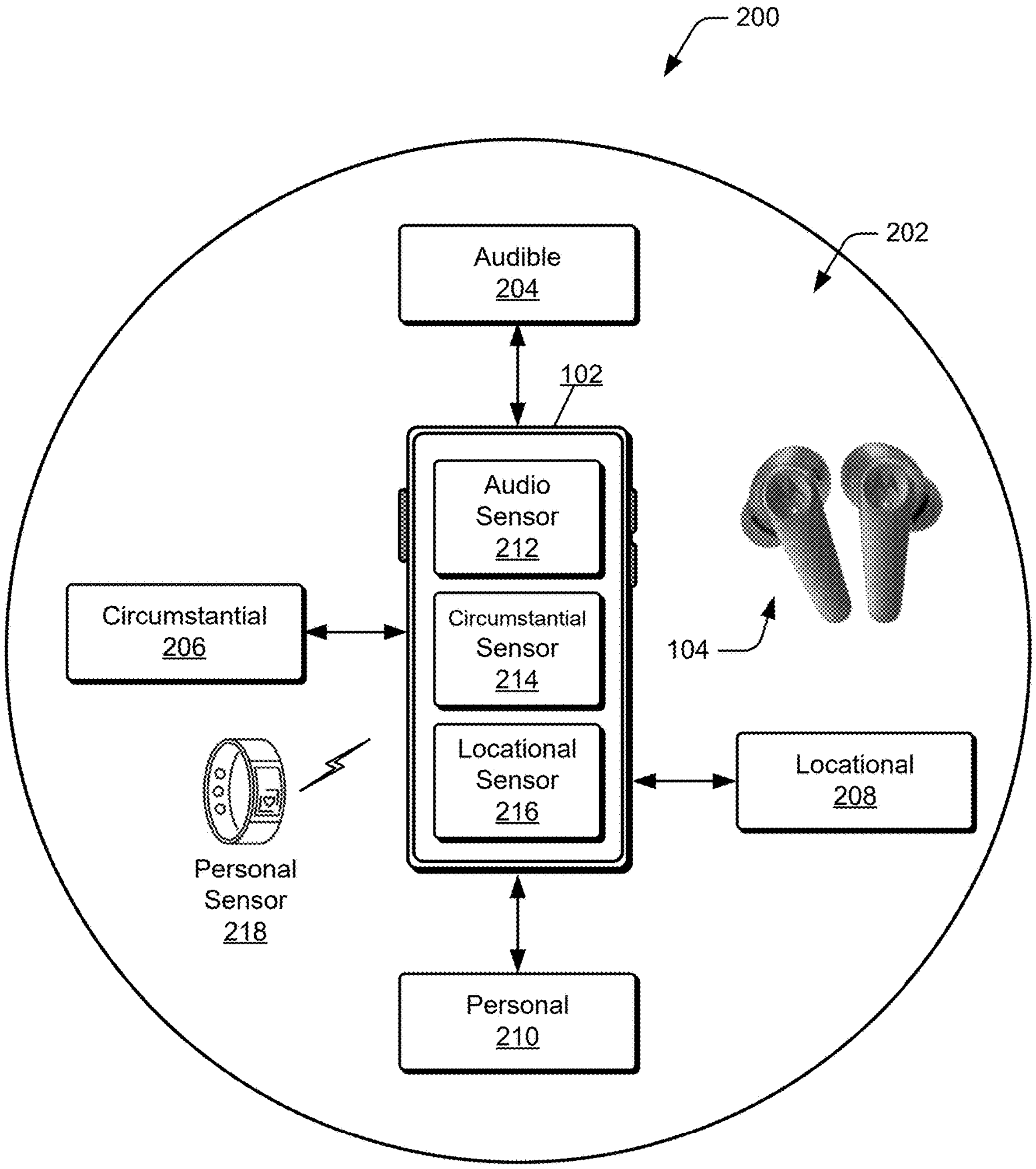
FIG. 2 further illustrates an example of ANC adjustment in accordance with one or more implementations as described herein.

FIG. 2 illustrates an example 200 of ANC adjustment, as described herein. In this example 200, the mobile device 102 and/or the headset 104 monitors contextual conditions in an environment 202, or surrounding, or related to the mobile device 102 and/or the headset 104. The contextual conditions can include any combination of audible contextual conditions 204, circumstantial contextual conditions 206, locational contextual conditions 208, personal contextual conditions 210, and so on.

In one or more implementations, the mobile device 102 and/or the headset 104 includes (or communicates with) an audio sensor 212 for monitoring the audible contextual conditions 204. The mobile device 102 and/or the headset 104 can include a microphone used as the audio sensor 212. Additionally or alternatively, the audio sensor 212 may be a microphone within a watch or other device that is in communication with the mobile device 102 and/or with the headset 104, or a different or alternative microphone. It is further contemplated that one or more alternative audio sensors can be included as part of the audio sensor 212, or the audio sensor can include any combination of the aforementioned audio sensors.

In one or more implementations, the mobile device 102 and/or the headset 104 includes (or communicates with) a circumstantial sensor 214 for monitoring the circumstantial contextual conditions 206. As used herein, circumstantial contextual conditions 206 represent the type of media that is being audibly emitted from the headset 104. For example, the media could be music, a podcast, a meeting, or the like that is being emitted from the headset 104, particularly from the speakers 122 of the headset 104. As such, the circumstantial sensor 214 represents functionality (e.g., logic, software, and/or hardware) enabling the mobile device 102 and/or the headset 104 to determine the type of media being emitted from the headset 104 and monitor the type of media as a circumstantial contextual condition 206. The circumstantial sensor 214 can be a component of the noise cancellation manager 108 or otherwise a component of the mobile device 102 and/or the headset 104.

In one or more implementations, the mobile device 102 and/or the headset 104 includes (or communicates with) a locational sensor 216 for monitoring the locational contextual conditions 208. The mobile device 102 can include a global positioning system (GPS) that is used as the locational sensor 216. Additionally or alternatively, the locational sensor 216 can include a GPS separate from mobile device 102, but in communication with the mobile device 102.

In one or more implementations, the mobile device 102 and/or the headset 104 includes (or communicates with) a personal sensor 218 for monitoring the personal contextual conditions 210. As one example, a user of the mobile device 102 may wear a smart watch, an exercise monitor, or any other type of wearable device that monitors biometric and other data of the person carrying or wearing the wearable device. Such devices are typically separate from but in communication with the mobile device 102. Additionally or alternatively, it is contemplated that a personal sensor 218 can be integrated with the mobile device 102 and/or with the headset 104 for sensing personal contextual conditions 210 (e.g., biometric data) of the individual holding the mobile device 102 and/or wearing the headset 104. It is further contemplated that one or more alternative personal sensors can be included as part of the personal sensor 218 or the personal sensor can include any combination of the aforementioned personal sensors.

Generally, the noise cancellation manager 108 can monitor the various contextual conditions for changes that are designated as contextual triggers, or any occurrences of particular contextual conditions that are designated as the contextual triggers 130. Upon sensing of one or more contextual triggers, the noise cancellation manager 108 can determine if and/or when to adjust the ANC of the headset 104. The adjustment of the ANC can be performed based on the occurrence of at least one contextual trigger, as well as may be initiated and/or performed based on the occurrence of a combination of contextual triggers. The contextual triggers can be categorized in correspondence with the various contextual conditions that are monitored. Thus, changes in the audible contextual conditions 204 that are designated as contextual triggers, or any occurrences of particular audible contextual conditions 204 that are designated as contextual triggers, can be referred to as the audible contextual triggers.

Similarly, changes in the circumstantial contextual conditions 206 that are designated as circumstantial triggers, or any occurrences of particular circumstantial contextual conditions 206 that are designated as contextual triggers, can be referred to as the circumstantial contextual triggers. Changes in the locational contextual conditions 208 that are designated as contextual triggers, or any occurrences of particular locational contextual conditions 208 that are designated as contextual triggers, can be referred to as locational contextual triggers. Changes in the personal contextual conditions 210 that are designated as contextual triggers, or any occurrences of particular personal contextual conditions 210 that are designated as contextual triggers, can be referred to as personal contextual triggers.

Figure 3:
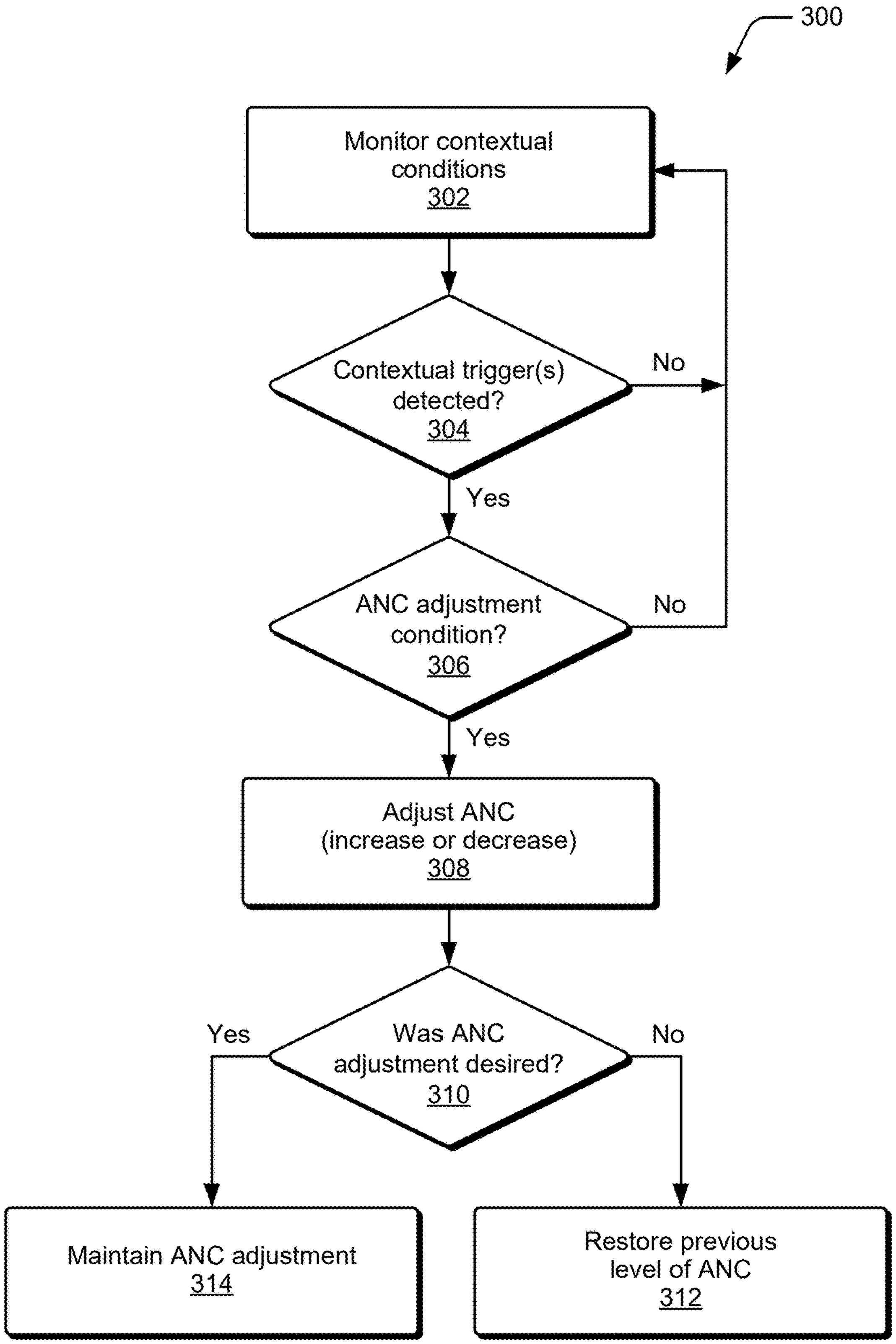
FIG. 3 is a flowchart illustrating an example of ANC adjustment in accordance with one or more implementations as described herein.

FIG. 3 illustrates an example of a flowchart 300 of one example of operation of ANC adjustment, as described herein. In this example at 302, contextual conditions associated with the mobile device 102 and/or the headset 104 are monitored for determining, at 304, if one or more contextual triggers are detected. If no contextual triggers are detected, then the mobile device 102 and/or the headset 104 continue to monitor for the contextual conditions at 302. If one or more contextual triggers are detected at 304, then the mobile device 102 determines, at 306, if the one or more contextual triggers indicate an ANC adjustment scenario. If there is no ANC adjustment scenario, the mobile device 102 and/or the headset 104 return to monitoring for the contextual conditions at 302. If the one or more contextual triggers do indicate an ANC adjustment scenario, then at 308, the mobile device 102 and/or the headset 104 performs an adjustment (increase or decrease) of the ANC feature of the headset. At this juncture, it is contemplated that the mobile device 102 and/or the headset 104 could return to continue monitoring for the contextual conditions at 302.

Alternatively, the mobile device 102 and/or the headset 104 can initiate to display a user interface that indicates to a user of the headset 104 that the ANC was adjusted and provide the user an opportunity to approve or disapprove of the adjustment. Thus, at 310, the mobile device 102 and/or the headset 104 determine whether the ANC adjustment was desired. If the user responds "no" or disapproves, then the adjustment is reversed at 312, and the previous level of ANC is restored. If the user responds "yes" or approves the ANC adjustment, then the adjustment is maintained at 314. The request to determine whether the user approves of the ANC adjustment can be displayed in a user interface on the display device of the mobile device 102. Alternatively, the mobile device 102 can initiate to determine user approval or disapproval of the ANC adjustment via the headset 104, such as with an audible request and receiving a verbal response from the user.

Contextual triggers are typically indicative of an ANC adjustment scenario. An ANC adjustment scenario as used herein, is any scenario where manual adjustment of the ANC feature is believed to be desired by a user based on contextual triggers, but is difficult to manually adjust, or manual adjustment of the ANC feature is based on the contextual triggers, but the user of the headset 104 is likely unaware that adjustment of the ANC is desirable.

Audible contextual triggers include any changes that are detected in the audible contextual conditions 204 which are designated as audible contextual triggers, or as any occurrences of the audible contextual conditions 204 that are designated as audible contextual triggers. Examples of audible contextual conditions 204 include, without limitation, one or any combination of the following: a change in ambient noise levels, particularly a relatively rapid change in ambient noise level, such as an increase or decrease (e.g., of at least 0.2, 0.5, or more decibels) in ambient noise level in a time span of less than one minute, less than 30 seconds, less than 10 seconds, or shorter; the occurrence of particular predetermined noises such as a ringtone, a doorbell, an alarm, combinations thereof, or the like; an ambient request by an individual not wearing the headset to increase or decrease the ANC; and/or any other type of additional audible contextual triggers usable according to the techniques described herein.

Circumstantial contextual triggers include any changes that are detected in the circumstantial contextual conditions 206 which are designated as circumstantial contextual triggers, or as occurrences of circumstantial contextual conditions 206 that are designated as circumstantial contextual triggers. Examples of circumstantial contextual triggers include, without limitation, one or any combination of: the initiation and/or having of a communication session (e.g., a meeting) via the mobile device 102 while listening and/or talking via the headset 104; the ending of a communication session via the mobile device 102; music being emitted from the headset 104 that is produced from the mobile device 102 or the headset 104; audiovisual content that is visible via the mobile device 102 and is audible via the headset 104; pre-selected content providing sound to the headset 104, where the pre-selected content is designated as content for which ANC is desired; pre-selected content providing sound to the headset 104 where the pre-selected content is designated as content for which ANC is undesirable; and/or any other type of additional circumstantial contextual triggers usable according to the techniques described herein.

Locational contextual triggers include any changes that are detected in the locational contextual conditions 208 which are designated as locational contextual triggers or as any occurrences of the locational contextual conditions 208 that are designated as locational contextual triggers. Examples of locational contextual conditions include, without limitation, one or any combination of: a location of the mobile device 102 and/or the headset 104 in a designated quiet location, such as in a user's office and/or residence; a location of the mobile device 102 and/or the headset 104 in a designated noisy location, such as in an airplane, a train, on a city street, or the like; a location of a person who may be a designated contact of a user of the headset 104 relative to the user (e.g., for example, a person near the user might indicate that ANC should be on or used since the person is likely to hear ambient noise that the user of the headset 104 otherwise would not) as determined by the location of a device of the person; movement of the mobile device 102 and/or the headset 104; a lack of movement of the mobile device 102 and/or the headset 104; movement of the mobile device 102 and/or the headset 104 into a location where ambient announcements are often made; movement of the mobile device 102 and/or the headset 104 into an area near a residence of the user of the headset 104; and/or any other type of additional locational contextual triggers usable according to the techniques described herein.

Personal contextual triggers include any changes that are detected in the personal contextual conditions 210 which are designated as personal contextual triggers, or any occurrences of personal contextual conditions 210 that are designated as personal contextual triggers. Examples of personal contextual conditions can include, without limitation, one or any combination of: a change in or occurrence of biometric data indicating sleep of a user of the headset 104; a change in or occurrence of biometric data indicating stress of the user of the headset 104; or a change in or occurrence of steps of the user of the headset 104. Additional personal contextual triggers may also be usable according to the techniques described herein.

It is contemplated that the mobile device 102 can perform an adjustment of the ANC of the headset 104 based on a single contextual trigger 130. For example, a relatively rapid increase in ambient noise may provide a significant likelihood of an ANC adjustment scenario that would cause the mobile device 102 and/or the headset 104, particularly the noise cancellation manager 108, to increase the ANC provided by the headset 104. Alternatively, a combination of the contextual triggers 130 may indicate an ANC adjustment scenario and may cause the mobile device 102 and/or the headset 104, particularly the noise cancellation manager 108, to increase or decrease the ANC provided by the headset 104. One example of a combination of the contextual triggers that might signal performance of an increase of ANC provided by the headset 104 is a relatively rapid increase in ambient noise in combination with any of the other contextual triggers, such as movement to a designated noisy location, the initiation and/or having of a meeting via the mobile device 102 while listening and/or talking via the headset 104, and/or an indication of steps being taken by the user of the headset 104.

An example of a combination of the contextual triggers that might signal performance of a decrease of the ANC provided by the headset 104 is the existence of and/or a relatively rapid decrease in ambient noise in combination with any of the other contextual triggers, such as movement to a designated quiet location, movement of a person who is a designated contact away from the user of the headset 104 (e.g., movement of the designated contact out of the designated quiet location) as determined by movement of a device of the user, and/or music being emitted from the headset 104 that is produced from the mobile device 102 and/or from the headset 104. Another example of a combination of the contextual triggers that might signal performance of a decrease of the ANC provided by the headset is the movement of the mobile device 102 and/or the headset 104 into a location where ambient announcements are often made in combination with any of the other contextual triggers, such as a change in or occurrence of biometric data indicating sleep of a user of the headset 104, and/or movement of the mobile device 102 and/or the headset 104 into an area near a residence of the user of the headset 104.

In an implementation of the techniques described herein, a machine learning model (e.g., a neural network, AI algorithms) is employed to determine whether, based on the contextual triggers, an ANC adjustment scenario is present or satisfied and/or an adjustment (e.g., increase or decrease) of the ANC is to be performed. This machine learning model is referred to herein as the adjustment machine learning model. The adjustment machine learning model may include artificial intelligence (AI), a machine learning (ML) algorithm, a convolutional neural network (CNN), and/or any other type of machine learning model to monitor contextual conditions, detect the contextual triggers, and/or determine whether an ANC adjustment scenario is present or satisfied and/or an adjustment (e.g., increase or decrease) of the ANC is to be performed.

The adjustment machine learning model can be included as part of the noise cancellation manager 108 or otherwise implemented in the mobile device 102 and/or the headset 104. The adjustment machine learning model can be trained using data from various sources. In one implementation, the adjustment machine learning model is provided data in the form of contextual conditions such as locations, ambient noise conditions, circumstantial conditions, photos, imitation scenarios, or the like. Such data can be provided to the adjustment machine learning model prior to use of the mobile device 102 and/or the headset 104 by a user. Alternatively or additionally, the adjustment machine learning model can be trained while it is in use by a user. The data exposes the adjustment machine learning model to contextual conditions that are designated as the contextual conditions and triggers 130, as well as standard contextual conditions that are not designated as contextual triggers. In this way, the adjustment machine learning model learns to distinguish between standard contextual conditions and contextual triggers that indicate a likelihood of an ANC adjustment scenario being present and/or satisfied.

It is generally desirable to expose the adjustment machine learning model to data that includes contextual triggers associated with an ANC adjustment scenario and contextual triggers not associated with an ANC adjustment scenario. For example, the data can include a scenario in which an ANC adjustment scenario is satisfied where the mobile device 102 and/or the headset 104 are in a designated quiet location followed by movement of the user to a designated noisy location that is accompanied by a relatively rapid increase in ambient noise. Then, in contrast, the data can include a similar scenario in which an ANC adjustment scenario is not satisfied, for example where the mobile device 102 and/or the headset 104 are in a designated quiet location followed by movement of the user to a designated noisy location, but the movement is not accompanied by a relatively rapid increase in ambient noise. In this way, the adjustment machine learning model can accurately determine when one or more contextual triggers indicates a relatively high likelihood of an ANC adjustment scenario, or when one or more contextual triggers indicate a relatively low likelihood of an ANC adjustment scenario.

Once the contextual trigger or triggers are detected and it is determined that an ANC adjustment scenario is present or satisfied, the mobile device 102 and/or the headset 104, particularly the noise cancellation manager 108, signals the adjustment (e.g., increase or decrease) of the ANC feature of the headset 104. In turn, the adjustment is performed on the headset 104. In some implementations of ANC adjustment, the mobile device 102 and/or the headset 104, after the adjustment is performed, returns to monitoring of the contextual conditions. Alternatively or in addition, one or more further actions are taken. As discussed with reference to FIG. 3, the mobile device 102 and/or the headset 104 can be implemented to indicate to a user of the headset 104 that the ANC was adjusted and provide the user with an opportunity to approve or disapprove of the ANC adjustment. As another option, the headset 104 can produce, such as based on a command from the noise cancellation manager 108, an audible sound (e.g., a beep, a voice indicating the change, or the like) indicating that the ANC has been adjusted and provide the user an opportunity to approve or disapprove of the ANC adjustment. It is also contemplated that such an audible sound can be produced prior to adjustment of the ANC and provide the user an opportunity to approve of the adjustment or disapprove of the adjustment. Further yet, it is contemplated that the adjustment of the ANC may be reversed under certain conditions. For example, if the contextual triggers leading to the ANC adjustment are reversed or become non-present, the ANC could automatically adjust back to its previous level of ANC prior to the automatic change.

Example methods 400, 500 and 600 are described with reference to respective FIGS. 4, 5, and 6 in accordance with one or more implementations of ANC adjustment as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
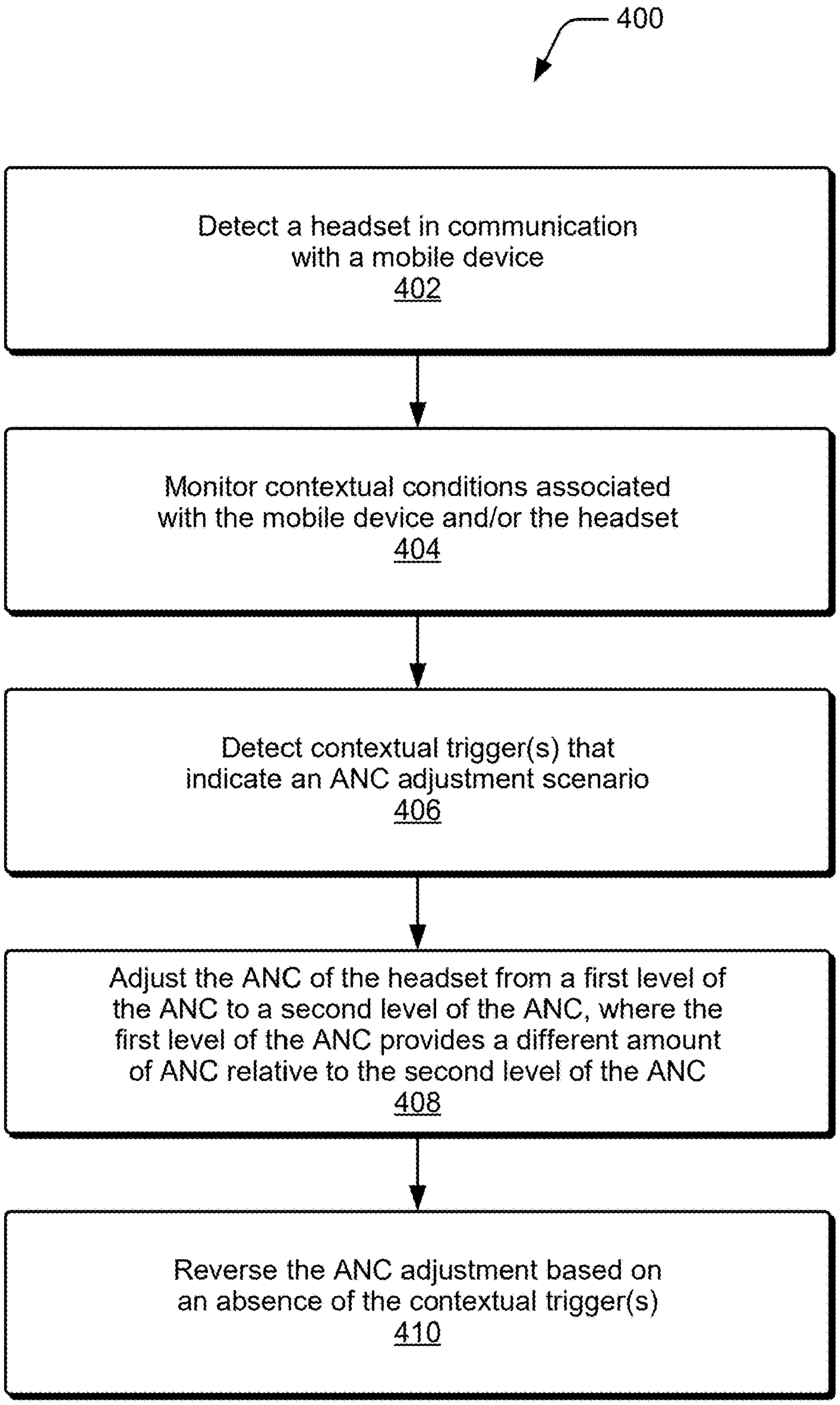
FIGS. 4-6 illustrate example methods for ANC adjustment in accordance with one or more implementations of the techniques described herein.

FIG. 4 illustrates an example method 400 for ANC adjustment. The order in which the method is described is not intended to be construed as a limitation, and any number or combination of the described method operations may be performed in any order to perform a method, or an alternate method.

At 402, a headset is detected to be in communication with a mobile device. For example, the noise cancellation manager 108 detects that the headset 104 is in communication with the mobile device 102. At 404, contextual conditions associated with the mobile device and/or the headset are monitored. For example, the noise cancellation manager 108 implemented by the mobile device 102 and/or the headset 104 monitors the contextual conditions, particularly the audible contextual conditions 204, the circumstantial contextual conditions 206, and the locational contextual conditions 208. The monitoring is accomplished using an audio sensor 212 (e.g., a microphone), a circumstantial sensor 214, and/or a locational sensor 216 of the mobile device 102 and/or the headset 104. In an example scenario, a user of the headset 104 is at location that is designated as a quiet location, such as the user's office at a worksite, and typically, the user is not using the ANC feature of the headset 104 since the user is initially in a quiet location.

At 406, one or more contextual triggers are detected that indicate an ANC adjustment scenario. For example, the noise cancellation manager 108 detects the one or more contextual triggers based on the monitoring of the contextual conditions (at 404). The contextual triggers can include a locational contextual trigger, which is the user leaving the quiet location. The contextual triggers can also include an audible contextual trigger, which is a relatively rapid increase in ambient noise due to the user entering a populated area of the worksite, such as a designated break area of the worksite where several individuals are engaged in conversation. The contextual triggers can also include a circumstantial contextual trigger, which is the user employing the headset to listen to content via an application (e.g., a teleconference meeting application), which is typically used for live communication.

At 408, the ANC of the headset is adjusted from a first level of the ANC to a second level of the ANC, where the first level of the ANC provides a different amount of ANC relative to the second level of the ANC. For example, the noise cancellation manager 108 implemented by the mobile device 102 and/or the headset 104 adjusts (e.g., increases or decreases) the ANC feature of the headset 104 from a first level of the ANC to a second level of the ANC. In implementations, the noise cancellation manager 108 determines that the contextual triggers provide a likelihood that an ANC adjustment scenario is present and/or satisfied. In turn, the mobile device 102 and/or the headset 104, particularly the noise cancellation manager 108, then causes the ANC of the headset 104 to be increased or turned on. In this scenario, the increase in ANC is welcomed since the user would have wanted to increase the ANC, but the user's hands were full and unable to manually activate or increase the ANC feature.

At 410, the ANC adjustment is reversed based on an absence of the contextual triggers(s). For example, the mobile device 102 and/or the headset 104, particularly the noise cancellation manager 108, causes the adjustment of the ANC to be reversed (i.e., decreased or turned off) when the user returns to the quiet location and the increase in ambient noise is gone.

Figure 5:
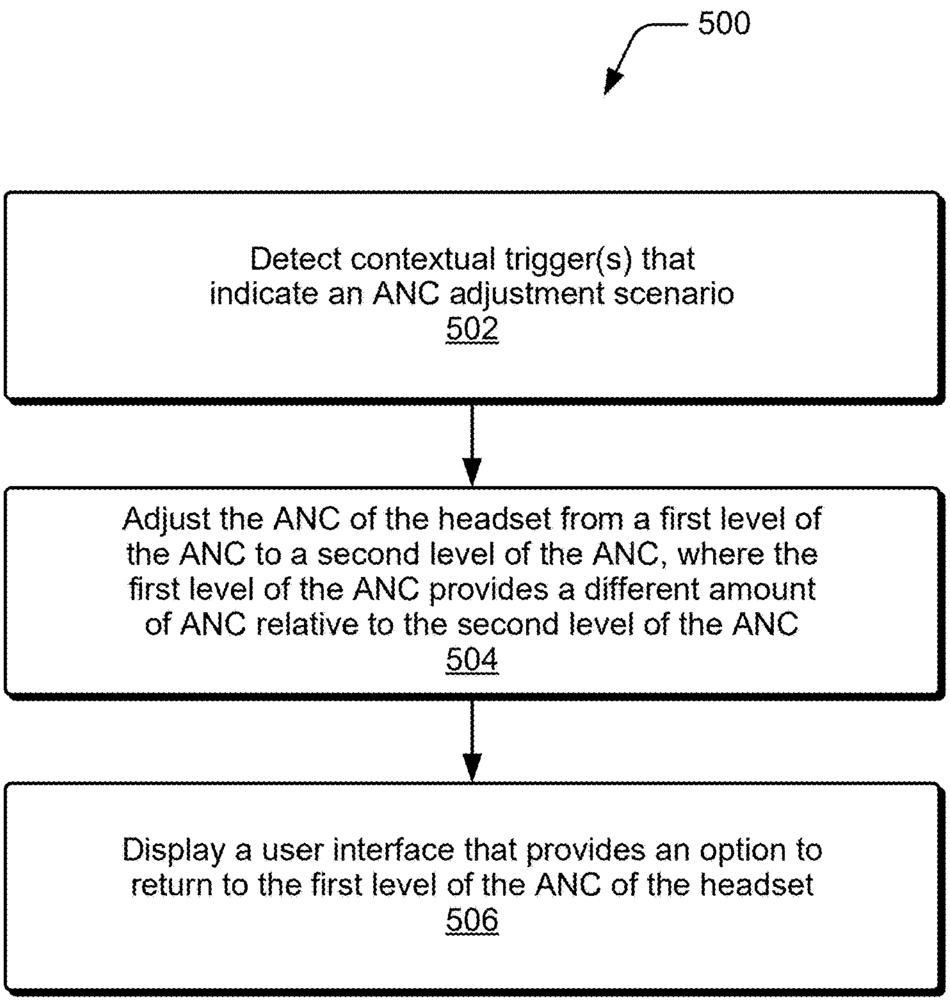

FIG. 5 illustrates an example method 500 for ANC adjustment. The order in which the method is described is not intended to be construed as a limitation, and any number or combination of the described method operations may be performed in any order to perform a method, or an alternate method.

At 502, one or more contextual triggers are detected that indicate an ANC adjustment scenario. For example, the noise cancellation manager 108 detects the one or more contextual triggers based on monitoring of the contextual conditions. The contextual conditions include the audible contextual conditions 204, the circumstantial contextual conditions 206, the locational contextual conditions 208, and/or the personal contextual conditions 210. The contextual triggers can include locational contextual trigger(s), such as the user nearing the user's residence and/or the user being in a location where announcements are often made. The contextual triggers could further include a personal contextual trigger, such as the user falling asleep. The contextual triggers could also include a circumstantial trigger, such as the user listening to music which is content that allows for a decrease in ANC. With reference to an example scenario, a user of the headset 104 may be riding public transportation to the user's residence, and the user is using the ANC feature of the headset 104 since the public transportation is loud and the user would like to listen to music.

At 504, the ANC of the headset is adjusted from a first level of the ANC to a second level of the ANC, where the first level of the ANC provides a different amount of ANC relative to the second level of the ANC. For example, the noise cancellation manager 108 implemented by the mobile device 102 and/or the headset 104 adjusts (e.g., increases or decreases) the ANC feature of the headset 104 from a first level of the ANC to a second level of the ANC. In implementations, the noise cancellation manager 108 determines that the contextual triggers provide a likelihood that an ANC adjustment scenario is present and/or satisfied. In turn, the mobile device 102 and/or the headset 104, particularly the noise cancellation manager 108, then causes the ANC of the headset 104 to be decreased or turned off. In this scenario, the decrease in ANC is welcomed since the user hears an announcement that the user's stop is coming up. If the ANC had remained on, the user may have missed the stop.

At 506, a user interface is displayed that provides an option to return to the first level of the ANC of the headset. For example, the noise cancellation manager 108 can cause the mobile device 102 to display a user interface after an ANC adjustment 132, and the user interface provides a user of the mobile device the option to return to the previous level of the ANC.

Figure 6:
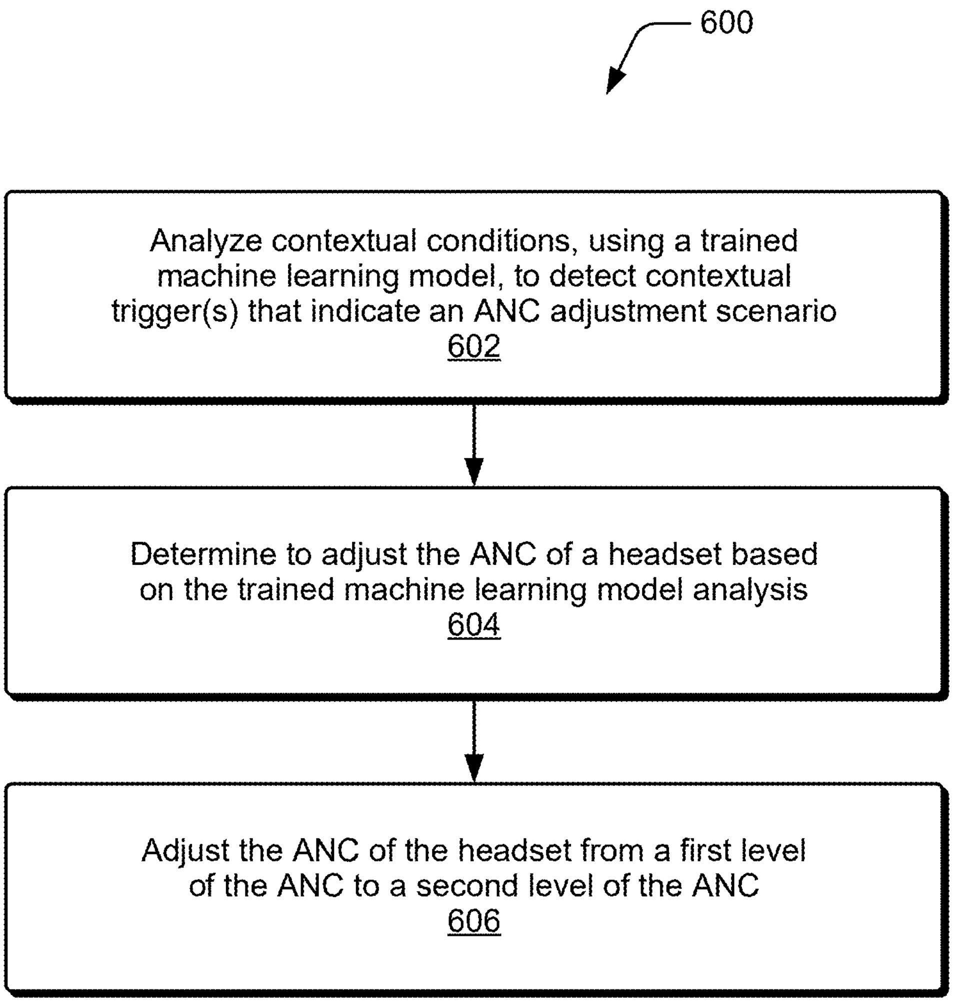

FIG. 6 illustrates an example method 600 for ANC adjustment. The order in which the method is described is not intended to be construed as a limitation, and any number or combination of the described method operations may be performed in any order to perform a method, or an alternate method.

At 602, contextual conditions are analyzed, using a trained machine learning model, to detect contextual trigger (s) that indicate an ANC adjustment scenario. For example, the noise cancellation manager 108 monitors for contextual conditions and utilizes a trained machine learning model to detect one or more contextual triggers that indicate an ANC adjustment scenario of the headset 104. The mobile device 102 and/or the headset 104 monitors for the contextual conditions, particularly the audible contextual conditions 204 and the locational contextual conditions 208.

At 604, an adjustment of the ANC of the headset is determined based on the trained machine learning model analysis. For example, the noise cancellation manager 108 determines to adjust the ANC feature of the headset 104 based on the trained machine learning model analysis of the contextual conditions to detect the one or more contextual triggers (at 602). At 606, the ANC of the headset is adjusted from a first level of the ANC to a second level of the ANC. For example, the noise cancellation manager 108 implemented by the mobile device 102 and/or the headset 104 adjusts (e.g., increases or decreases) the ANC feature of the headset 104 from a first level of the ANC to a second level of the ANC.

Figure 7:
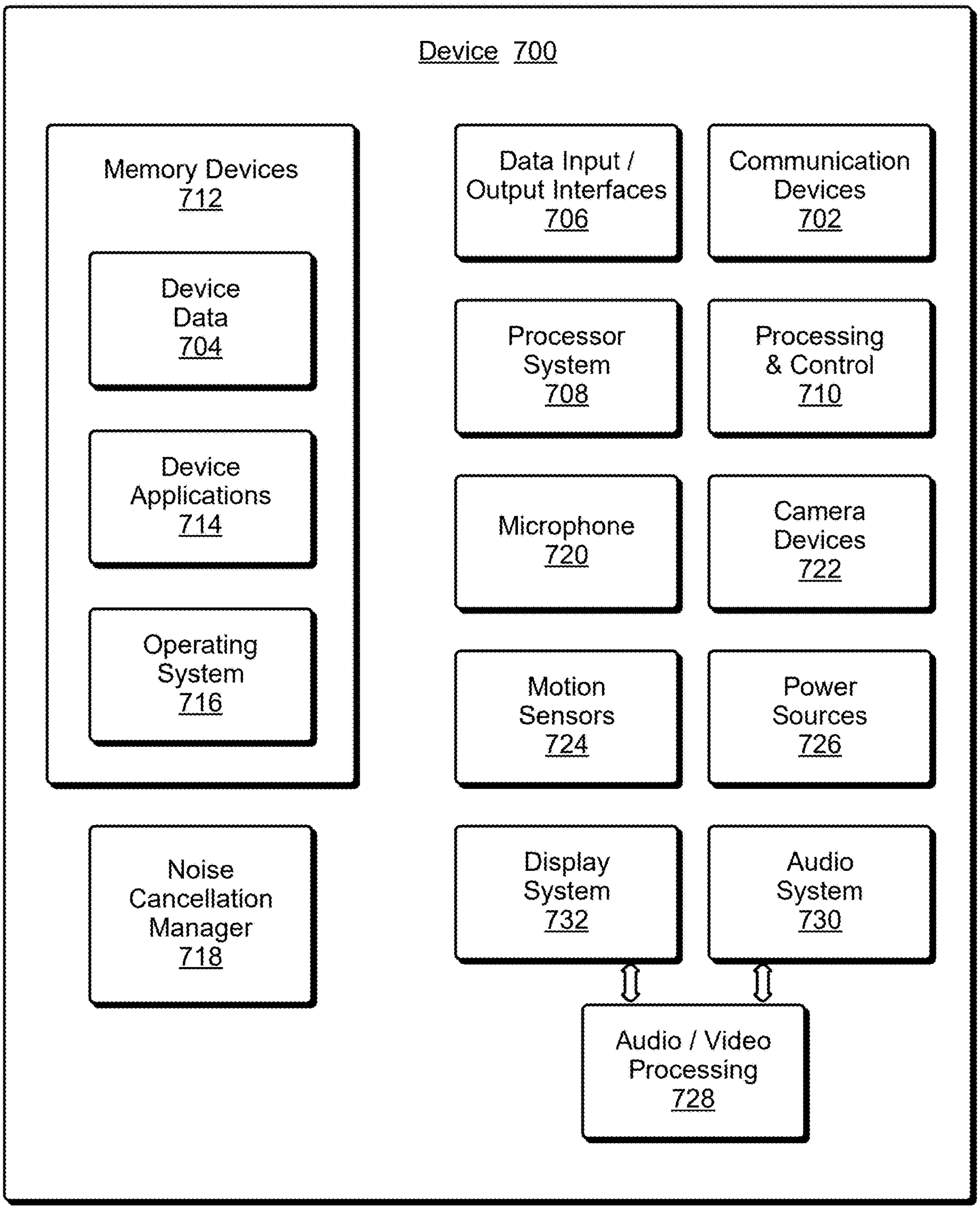
FIG. 7 illustrates various components of an example device that may be used to implement the techniques for ANC adjustment as described herein.

FIG. 7 illustrates various components of an example device 700, which can implement aspects of the techniques and features for ANC adjustment, as described herein. The example device 700 may be implemented as any of the devices described with reference to the previous FIGS. 1-6, such as any type of a wireless device, mobile device, mobile phone, flip phone, client device, companion device, display device, tablet, computing, communication, entertainment, gaming, media playback, and/or any other type of computing and/or electronic device. For example, the mobile device 102 and/or headset 104 described with reference to FIGS. 1-6 may be implemented as the example device 700.

The example device 700 can include various, different communication devices 702 that enable wired and/or wireless communication of device data 704 with other devices. The device data 704 can include any of the various devices data and content that is generated, processed, determined, received, stored, and/or communicated from one computing device to another. Generally, the device data 704 can include any form of audio, video, image, graphics, and/or electronic data that is generated by applications executing on a device. The communication devices 702 can also include transceivers for cellular phone communication and/or for any type of network data communication.

The example device 700 can also include various, different types of data input/output (I/O) interfaces 706, such as data network interfaces that provide connection and/or communication links between the devices, data networks, and other devices. The data I/O interfaces 706 may be used to couple the device to any type of components, peripherals, and/or accessory devices, such as a computer input device that may be integrated with the example device 700. The I/O interfaces 706 may also include data input ports via which any type of data, information, media content, communications, messages, and/or inputs may be received, such as user inputs to the device, as well as any type of audio, video, image, graphics, and/or electronic data received from any content and/or data source.

The example device 700 includes a processor system 708 of one or more processors (e.g., any of microprocessors, controllers, and the like) and/or a processor and memory system implemented as a system-on-chip (SoC) that processes computer-executable instructions. The processor system 708 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 710. The example device 700 may also include any type of a system bus or other data and command transfer system that couples the various components within the device. A system bus can include any one or combination of different bus structures and architectures, as well as control and data lines.

The example device 700 also includes memory and/or memory devices 712 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 712 include volatile memory and non-volatile memory, fixed and removable media devices, and any suitable memory device or electronic data storage that maintains data for computing device access. The memory devices 712 can include various implementations of random-access memory (RAM), read-only memory (ROM), flash memory, and other types of storage media in various memory device configurations. The example device 700 may also include a mass storage media device.

The memory devices 712 (e.g., as computer-readable storage memory) provide data storage mechanisms, such as to store the device data 704, other types of information and/or electronic data, and various device applications 714 (e.g., software applications and/or modules). For example, an operating system 716 may be maintained as software instructions with a memory device 712 and executed by the processor system 708 as a software application. The device applications 714 may also include a device manager, such as any form of a control application, software application, signal-processing and control module, code that is specific to a particular device, a hardware abstraction layer for a particular device, and so on.

In this example, the device 700 includes a noise cancellation manager 718 that implements various aspects of the described features and techniques described herein. The noise cancellation manager 718 may be implemented with hardware components and/or in software as one of the device applications 714, such as when the example device 700 is implemented as the mobile device 102 and/or headset 104 described with reference to FIGS. 1-6. An example of the noise cancellation manager 718 is the noise cancellation manager 108 implemented by the mobile device 102 and/or 104, such as a software application and/or as hardware components in the mobile device. In implementations, the noise cancellation manager 718 may include independent processing, memory, and logic components as a computing and/or electronic device integrated with the example device 700.

The example device 700 can also include a microphone 720 (e.g., to capture an audio recording of a user) and/or camera devices 722 (e.g., to capture video images of the user during a call), as well as motion sensors 724, such as may be implemented as components of an inertial measurement unit (IMU). The motion sensors 724 may be implemented with various sensors, such as a gyroscope, an accelerometer, and/or other types of motion sensors to sense motion of the device. The motion sensors 724 can generate sensor data vectors having three-dimensional parameters (e.g., rotational vectors in x, y, and z-axis coordinates) indicating location, position, acceleration, rotational speed, and/or orientation of the device. The example device 700 can also include one or more power sources 726, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 700 can also include an audio and/or video processing system 728 that generates audio data for an audio system 730 and/or generates display data for a display system 732. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 700. Alternatively, the audio system and/or the display system are external, peripheral components to the example device.

Although implementations of ANC adjustment have been described in language specific to features and/or methods, the appended claims are not necessarily limited to the specific features or methods described. Rather, the specific features and methods are disclosed as example implementations of ANC adjustment, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A mobile device, comprising: at least one processor coupled with a memory; and a noise cancellation manager configured to cause the mobile device to: detect a headset in communication with the mobile device; monitor contextual conditions associated with ANC of the headset; detect one or more contextual triggers from the contextual conditions, the one or more contextual triggers indicating at least one ANC adjustment scenario; and adjust the ANC of the headset from a first level of the ANC to a second level of the ANC based on the at least one ANC adjustment scenario, the first level of the ANC providing a different amount of the ANC relative to the second level of the ANC.

Alternatively, or in addition to the above-described mobile device, any one or combination of: the noise cancellation manager is configured to cause the mobile device to display, after an ANC adjustment, a user interface that provides an option to return to the first level of the ANC. The one or more contextual triggers includes a detected change of at least one of a quiet location, a noisy location, movement, or a lack of the movement. The one or more contextual triggers include an elevation in ambient noise detected by at least one of the mobile device or the headset; and the second level of the ANC is greater than the first level of the ANC. The first level of the ANC is the ANC turned-on to cancel external noise in an environment that includes a user of the headset and an additional user who has an additional device that is associated with the mobile device of the user; the one or more contextual triggers include detecting that the additional device has left the environment, leaving the user of the headset alone in the environment; and the second level of the ANC is the ANC turned-off as adjusted from a first level of the ANC to a second level of the ANC. The one or more contextual triggers includes movement of at least one of the mobile device or the headset into a location where ambient announcements occur. To detect the one or more contextual triggers, the noise cancellation manager is configured to cause the mobile device to analyze, using a trained machine learning module, the contextual conditions and determine to adjust the ANC of the headset. The trained machine learning module is at least partially trained by recording instance contextual conditions from the monitored contextual conditions, the instance contextual conditions being the contextual conditions present when the ANC is manually adjusted, and the machine learning module thereby being trained to recognize changes of the monitored contextual conditions as the one or more contextual triggers that signal to adjust the ANC of the headset.

A method, comprising: detecting a headset in communication with a mobile device; monitoring contextual conditions associated with at least one of the mobile device or the headset; detecting based on the monitoring of the contextual conditions, one or more contextual triggers indicating at least one ANC adjustment scenario; and adjusting, based on the one or more contextual triggers, an ANC of the headset from a first level of the ANC to a second level of the ANC, the first level of the ANC providing a different amount of the ANC relative to the second level of the ANC.

Alternatively, or in addition to the above-described method, any one or combination of: displaying, after the adjusting the ANC, a user interface that provides an option to return to the first level of the ANC. The one or more contextual triggers include a detected change of at least one of a quiet location, a noisy location, a moving state, or a stationary state. The one or more contextual triggers include at least one of a persistent elevation in ambient noise or a change from a quiet location to a noisy location; the mobile device is in a voice communication mode; and the second level of the ANC is greater than the first level of the ANC. At least one of the contextual conditions is a location of the mobile device at a user residence; the one or more contextual triggers include detection of a location of an additional device leaving the user residence; and the second level of the ANC is less than the first level of the ANC. The one or more contextual triggers include arrival of the mobile device at a location where ambient announcements occur. The detecting of the one or more contextual triggers includes analyzing, using a trained machine learning module, the contextual conditions to determine the adjusting of the ANC. The trained machine learning module is at least partially trained by recording instance contextual conditions from the monitored contextual conditions, the instance contextual conditions being the contextual conditions present when the ANC is manually adjusted, and the machine learning module thereby being trained to recognize changes of the monitored contextual conditions as the one or more contextual triggers that signal to adjust the ANC of the headset.

A system, comprising: a headset having ANC; a processor configured to implement a noise cancellation manager to: detect one or more contextual triggers indicating at least one ANC adjustment scenario; and adjust, based on the one or more contextual triggers, the ANC of the headset from a first level of the ANC to a second level of the ANC, the first level of the ANC providing a different amount of the ANC relative to the second level of the ANC.

Alternatively, or in addition to the above-described method, any one or combination of: the processor is configured to cause the system to display, after the ANC adjustment, a user interface that provides an option to return to the first level of the ANC. The one or more contextual triggers include an elevation in ambient noise, and the second level of the ANC is greater than the first level of the ANC. To detect the one or more contextual triggers, the processor is configured to cause the system to analyze contextual conditions, using a trained machine learning module, and determine to adjust the ANC of the headset.

The invention claimed is:

1. A mobile device, comprising:

at least one processor coupled with a memory; and a noise cancellation manager configured to cause the mobile device to:

detect a headset in communication with the mobile device;

monitor contextual conditions associated with active noise cancellation (ANC) of the headset, a contextual condition including a location of the mobile device in an environment with an additional mobile device;

detect one or more contextual triggers from the contextual conditions, the one or more contextual triggers indicating at least one ANC adjustment scenario that includes detection of the additional mobile device leaving the environment; and decrease a level of the ANC based on the at least one ANC adjustment scenario.

2. The mobile device of claim 1, wherein the noise cancellation manager is configured to cause the mobile device to display, after an ANC adjustment, a user interface that provides an option to return to a previous level of the ANC.

3. The mobile device of claim 1, wherein:

the one or more contextual triggers include an elevation in ambient noise detected by at least one of the mobile device or the headset; and the noise cancellation manager is configured to cause the mobile device to increase the level of the ANC.

4. The mobile device of claim 1, wherein, to decrease the level of the ANC, the ANC is turned-off.

5. The mobile device of claim 1, wherein the one or more contextual triggers includes movement of at least one of the mobile device or the headset into a noisy location where ambient announcements occur.

6. A method, comprising:

detecting a headset in communication with a mobile device;

monitoring contextual conditions associated with at least one of the mobile device or the headset, a contextual condition including a location of the mobile device in an environment with an additional mobile device;

detecting, based on the monitoring of the contextual conditions, one or more contextual triggers indicating at least one active noise cancellation (ANC) adjustment scenario that includes detection of the additional mobile device leaving the environment; and decreasing a level of ANC based on the at least one ANC adjustment scenario.

7. The method of claim 6, further comprising displaying, after the decreasing the level of the ANC, a user interface that provides an option to return to a previous level of the ANC.

8. The method of claim 6, wherein:

the one or more contextual triggers include at least one of a persistent elevation in ambient noise or a change from a quiet location to a noisy location;

the mobile device is in a voice communication mode; and increasing the level of the ANC.

9. The method of claim 6, wherein the decreasing the level of the ANC is the ANC turned-off.

10. The method of claim 6, wherein the one or more contextual triggers include arrival of the mobile device at a noisy location where ambient announcements occur.

11. A system, comprising:

a headset having active noise cancellation (ANC) in an environment; and a processor configured to implement a noise cancellation manager to:

detect one or more contextual triggers indicating at least one ANC adjustment scenario that includes detection of a device leaving the environment; and decrease a level of the ANC of the headset based on the at least one ANC adjustment scenario.

12. The system of claim 11, wherein the processor is configured to cause the system to display, after an ANC adjustment, a user interface that provides an option to return to a previous level of the ANC.

13. The system of claim 11, wherein the one or more contextual triggers include an elevation in ambient noise, and the noise cancellation manager is configured to increase the level of the ANC.

14. The system of claim 11, wherein, to decrease the level of the ANC, the ANC is turned-off.

* * * * *